US012659975B2

(12) United States Patent
Guo et al.

(10) Patent No.: US 12,659,975 B2
(45) Date of Patent: Jun. 16, 2026

(54) INTER-UE COORDINATION PROCEDURE FOR SPS TRAFFIC

(71) Applicant: QUALCOMM Incorporated, San Diego, CA (US)

(72) Inventors: Hui Guo, Beijing (CN); Tien Viet Nguyen, Bridgewater, NJ (US); Shuanshuan Wu, San Diego, CA (US); Sourjya Dutta, San Diego, CA (US); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 18/560,580

(22) PCT Filed: Jul. 30, 2021

(86) PCT No.: PCT/CN2021/109642
§ 371 (c)(1),
(2) Date: Nov. 13, 2023

(87) PCT Pub. No.: WO2023/004761
PCT Pub. Date: Feb. 2, 2023

(65) Prior Publication Data
US 2024/0260059 A1 Aug. 1, 2024

(51) Int. Cl.
*H04W 72/25* (2023.01)
*H04W 72/11* (2023.01)

(52) U.S. Cl.
CPC ............ *H04W 72/25* (2023.01); *H04W 72/11* (2023.01)

(58) Field of Classification Search
CPC ...... H04W 72/25; H04W 76/14; H04W 72/11
See application file for complete search history.

(56) References Cited

U.S. PATENT DOCUMENTS

2021/0314966 A1* 10/2021 Hui ....................... H04W 72/56
2023/0141004 A1* 5/2023 Hong ................ H04W 72/1263
370/311

(Continued)

FOREIGN PATENT DOCUMENTS

EP          4057723 A1 * 9/2022 ............ H04W 72/02
WO    WO-2020033226 A1 * 2/2020 ........ H04W 74/0816

OTHER PUBLICATIONS

ERICSSON: "Mode 2 Enhancements Using Inter-UE Coordination", 3GPP TSG RAN WG1 #104b-e, R1-2103705, 3rd Generation Partnership Project, Mobile Competence Centre, 650, Route Des Lucioles, F-06921 Sophia-Antipolis Cedex, France, vol. Ran WG1, No. e-Meeting, Apr. 12, 2021-Apr. 20, 2021 Apr. 6, 2021, XP051993481, 15 Pages, Figure 1, Table 1.

(Continued)

*Primary Examiner* — Brian D Nguyen
(74) *Attorney, Agent, or Firm* — Procopio, Cory, Hargreaves & Savitch LLP

(57) ABSTRACT

A first user equipment (UE) receives sidelink resource reservation information over sidelink from one or more UEs. The first UE transmits inter-UE coordination information in a sidelink transmission based on a probability threshold being met. A wireless device may receive one or more of a status of a UE, a capability of the UE, or a report. The wireless device may configure the UE with a probability threshold for transmission of inter-UE coordination information in a sidelink transmission.

38 Claims, 14 Drawing Sheets

(56)                    References Cited

U.S. PATENT DOCUMENTS

| | | | | |
|---|---|---|---|---|
| 2023/0199804 A1* | 6/2023 | Hwang | ..................... | H04L 5/16 |
| 2023/0269705 A1* | 8/2023 | Park | .................. | H04W 72/563 |
| | | | | 370/329 |
| 2023/0276474 A1* | 8/2023 | Mohammad | .......... | H04W 72/02 |
| | | | | 370/329 |
| 2024/0080868 A1* | 3/2024 | Selvanesan | ........... | H04W 72/40 |
| 2024/0098727 A1* | 3/2024 | Hassan | ................ | H04W 72/11 |

OTHER PUBLICATIONS

Intel Corporation: "Design Options to Support Priority for V2V Communication", 3GPP TSG RAN WG1 Meeting #86, R1-167693, Intel—V2V Priority, 3rd Generation Partnership Project, Mobile Competence Centre, 650, Route Des Lucioles, F-06921 Sophia-Antipolis Cedex, France, vol. Ran WG1, No. Gothenburg, Sweden, Aug. 22-26, 2016, Aug. 21, 2016, XP051126031, pp. 1-6, paragraph [03.2], figure 1.
International Search Report and Written Opinion—PCT/CN2021/109642—ISA/EPO—Mar. 29, 2022.
Partial International Search Report—PCT/CN2021/109642—ISA/EPO—Feb. 14, 2022.
Samsung: "On Inter-UE Coordination for Mode2 Enhancements", 3GPP Draft, 3GPP TSG RAN WG1 #105-e, R1-2105335, 3rd Generation Partnership Project (3GPP), Mobile Competence Centre, 650, Route Des Lucioles, F-06921 Sophia-Antipolis Cedex, France vol. RAN WG1, No. e-Meeting, May 10, 2021-May 27, 2021 May 12, 2021 (May 12, 2021), XP052011379, 7 Pages, Paragraph [2.1.2].

\* cited by examiner

1000

1002

Receive sidelink resource reservation information over sidelink from one or more UEs

1004

Transmit inter-UE coordination information in a sidelink transmission based on a probability threshold being met, the inter-UE coordination information being based on the sidelink resource reservation information received from the one or more UEs

1100

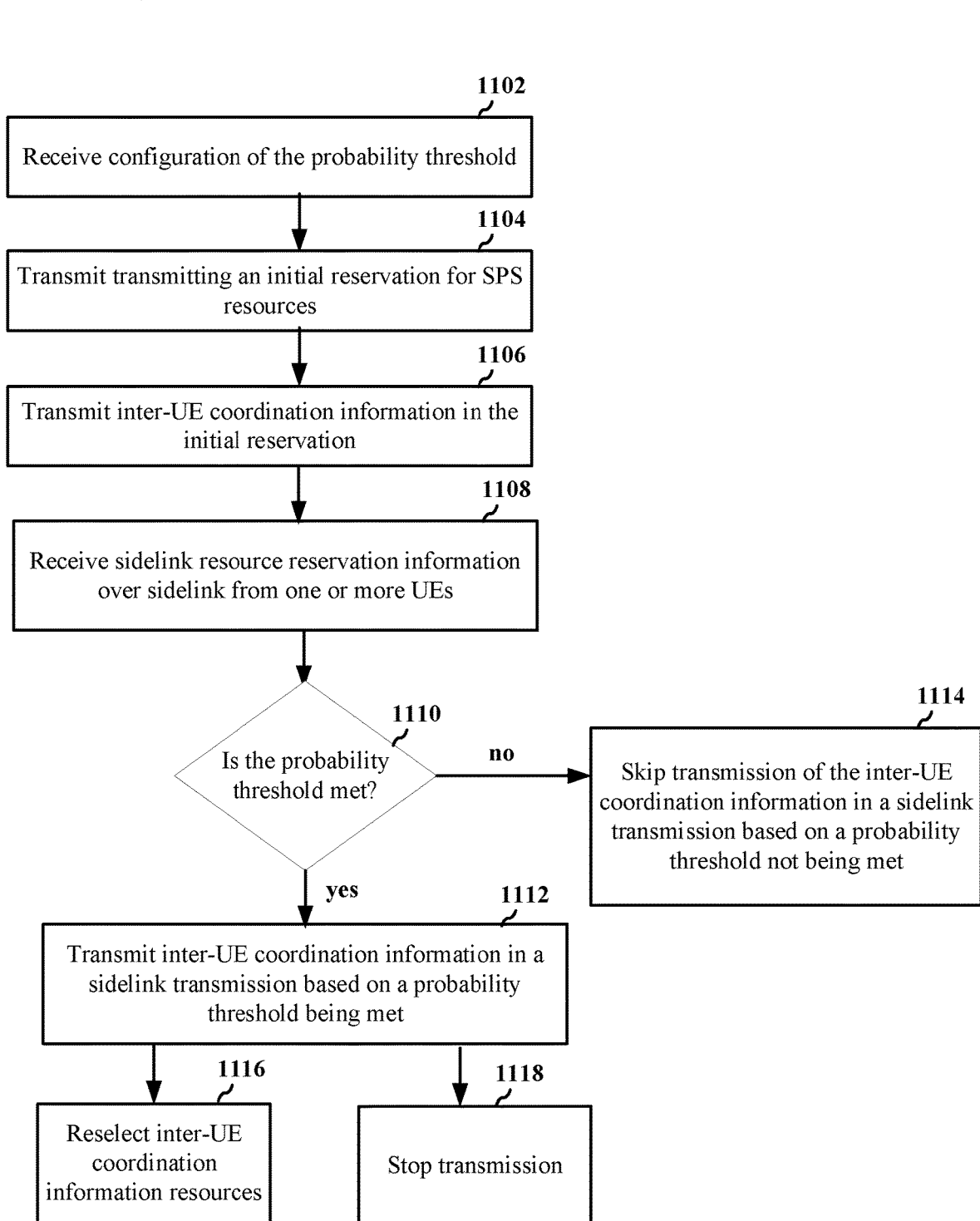

1102

Receive configuration of the probability threshold

1104

Transmit transmitting an initial reservation for SPS resources

1106

Transmit inter-UE coordination information in the initial reservation

1108

Receive sidelink resource reservation information over sidelink from one or more UEs

1110

Is the probability threshold met?

no → 1114

Skip transmission of the inter-UE coordination information in a sidelink transmission based on a probability threshold not being met yes

1112

Transmit inter-UE coordination information in a sidelink transmission based on a probability threshold being met

1116

Reselect inter-UE coordination information resources

1118

Stop transmission

Receive one or more of a status of a UE, a capability of the UE, or a report

1304

Configure a UE with a probability threshold for transmission of inter-UE coordination information in a sidelink transmission

INTER-UE COORDINATION PROCEDURE FOR SPS TRAFFIC

CROSS REFERENCE TO RELATED APPLICATION(S)

This application is a National Stage Application filed under 35 U.S.C. § 371 of PCT International Application No. PCT/CN2021/109642, entitled "INTER-UE COORDINATION PROCEDURE FOR SPS TRAFFIC" and filed Jul. 30, 2021, which is expressly incorporated by reference herein in its entirety.

BACKGROUND

Technical Field

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE). The apparatus receives sidelink resource reservation information over sidelink from one or more UEs. The apparatus transmits inter-UE coordination information in a sidelink transmission based on a probability threshold being met, the inter-UE coordination information being based on the sidelink resource reservation information received from the one or more UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 11 is a flowchart of a method of wireless communication including the transmission of inter-UE coordination information.

DETAILED DESCRIPTION

Figure 1:
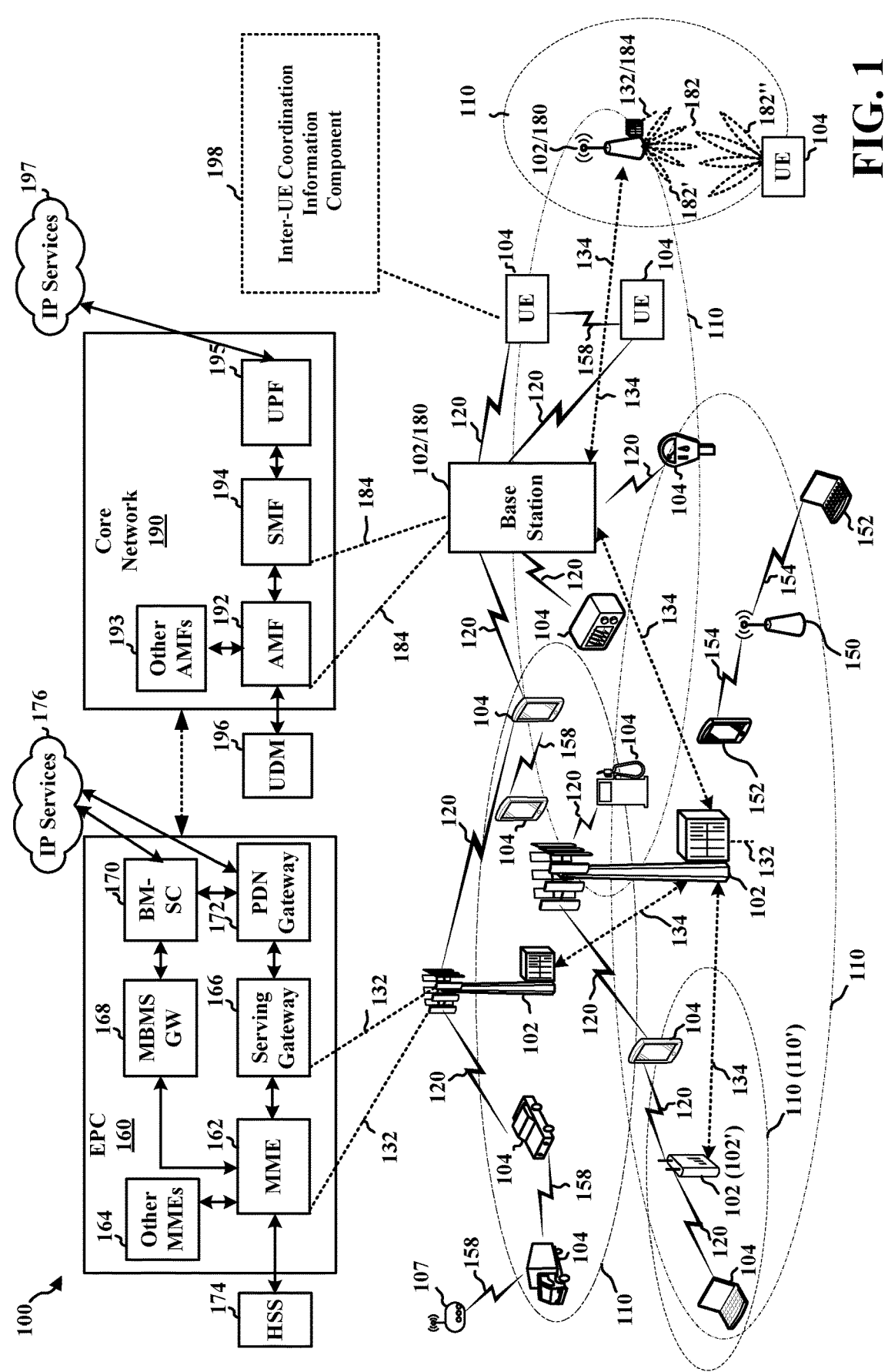
FIG. 1 is a diagram illustrating an example of a wireless communications system and an access network.

A UE may perform autonomous resource selection for sidelink transmission, which may be referred to as resource allocation mode 2 for sidelink communication. The UE may receive various types of information that may be used for sidelink resource selection. For example, the UE may perform sensing to receive sidelink resource reservations of other UEs. As another example, the UE may receive sidelink reservation information from one or more other UEs. The sidelink reservation information may include a reservation of resources from the other UEs or may include inter-UE coordination information. Inter-UE coordination information may indicate at least one of preferred resources for sidelink transmission by the UE, non-preferred resources for sidelink transmission by the UE, or resource conflict information. The UE may include inter-UE coordination information based on the reservation information/inter-UE coordination information received from other UEs when transmitting its own resource reservation. Some sidelink reservations may be for semi-persistent scheduling (SPS) transmissions having periodically reserved resources. The UE may transmit an initial reservation and future SPS resources may be indicated by a prior SPS transmission. An additional reservation of the SPS resources may be redundant.

Aspects presented herein enable the UE to determine when to forward inter-UE coordination information in connection with SPS resources reserved by the UE. The aspects presented herein provide a balance between a reduction in inter-UE coordination information for SPS reserved transmissions (which reduces redundancy in sending the resource reservation for the SPS resources) while maintaining some reservation forwarding to improve inter-UE coordination reliability. As presented herein, the UE may determine whether to transmit inter-UE coordination information based on a probability threshold. The probability threshold may be configured. The probability threshold may be based on one or more conditions, including any of a channel busy ratio (CBR), a channel occupancy in inter-UE coordination dedicated resources, a geographic position of the UE, a resource collision ratio level, or a number of inter-UE coordination transmissions sent by the same UE over a period.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

In FIG. 1, a UE may receive inter-UE coordination information from another UE. The UE 104 may include an inter-UE coordination information component 198 configured to receive sidelink resource reservation information over sidelink from one or more UEs and transmit inter-UE coordination information in a sidelink transmission based on a probability threshold being met, the inter-UE coordination information being based on the sidelink resource reservation information received from the one or more UEs.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ- 7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
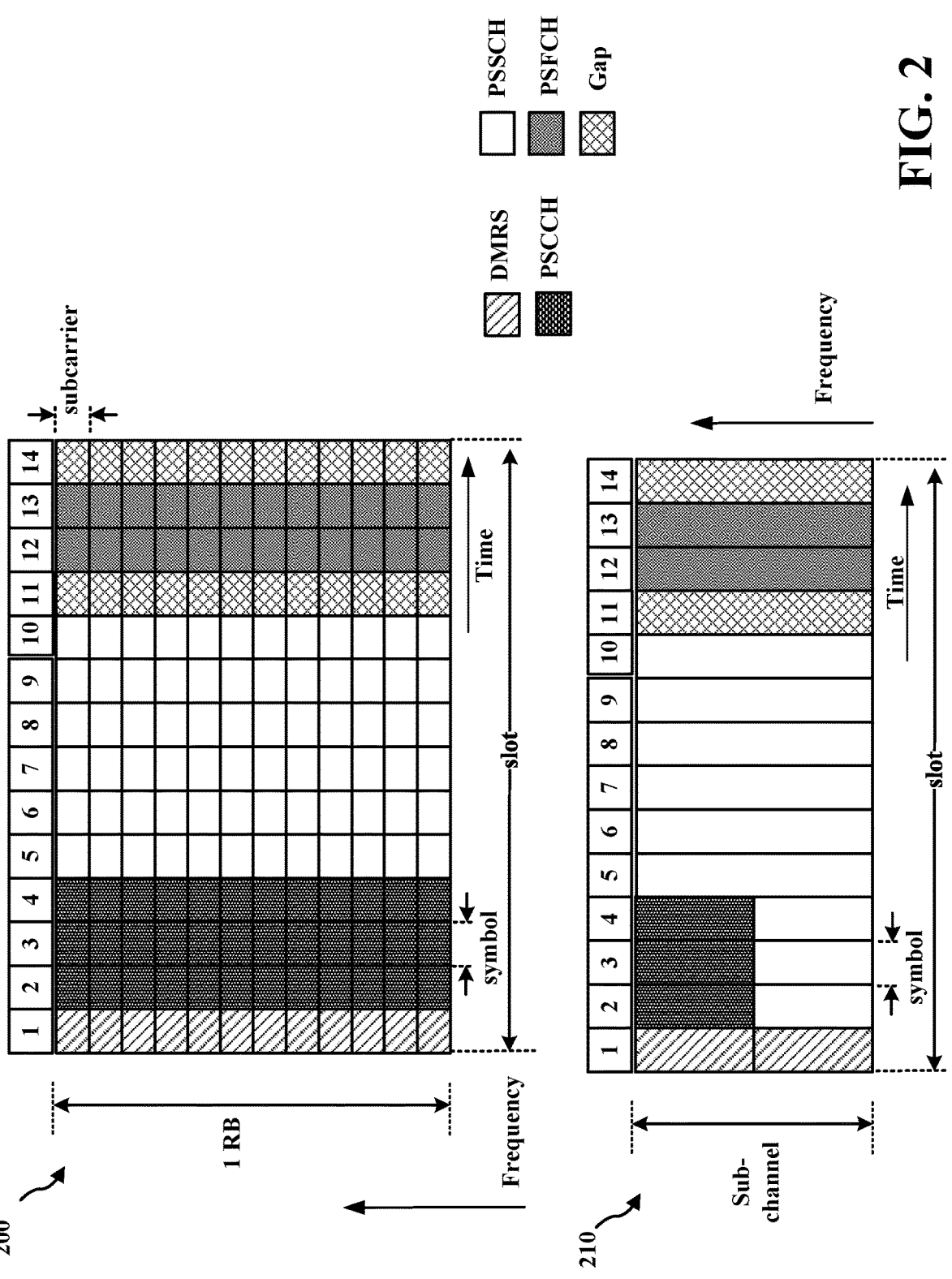
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
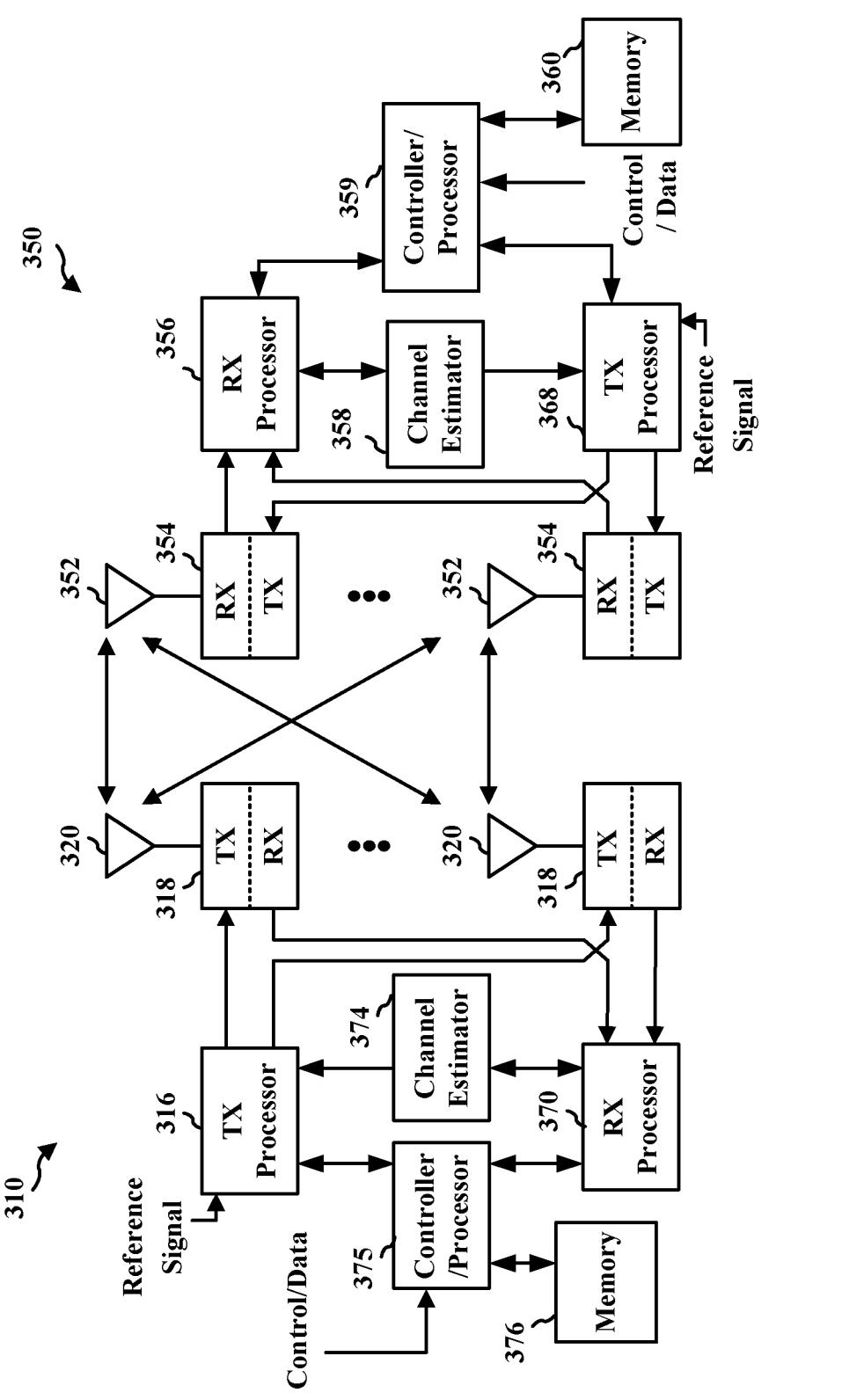
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate mapping matching, onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368/316, the RX processor 356/370, and the controller/processor 359/375 may be configured to perform aspects in connection with the inter-UE coordination information component 198 of FIG. 1.

Figure 4:
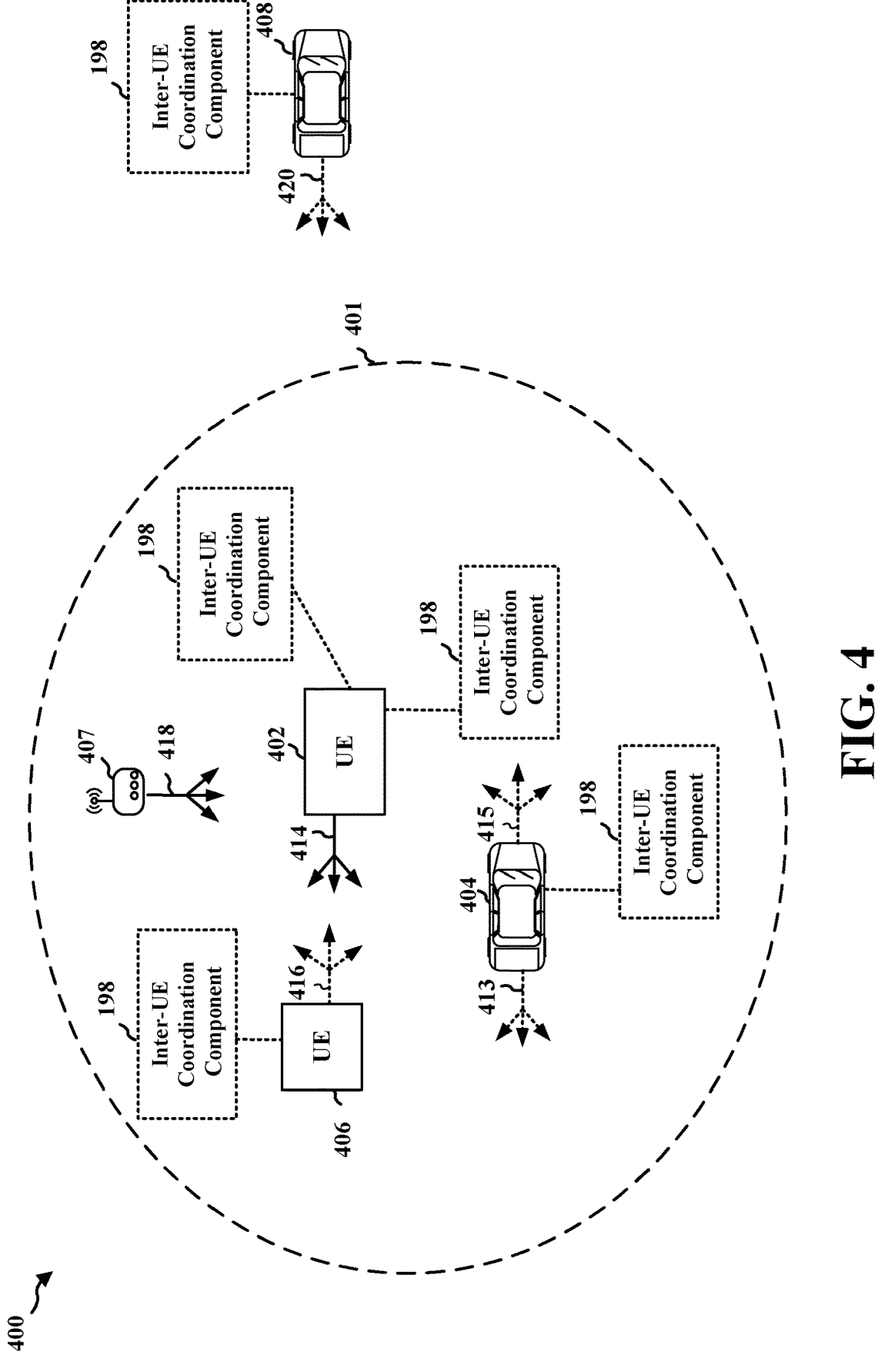
FIG. 4 illustrates example aspects of sidelink communication between devices, in accordance with aspects presented herein.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit communication 413, 415 intended for receipt by other UEs within a range 401 of UE 404, and UE 406 may transmit communication 416. Additionally/alternatively, RSU 407 may receive communication from and/or transmit communication 418 to UEs 402, 404, 406, 408. One or more of the UEs 402. 404, 406, 408 or the RSU 407 may comprise an inter-UE coordination information component 198.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided.

In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figures 5A, 5B:
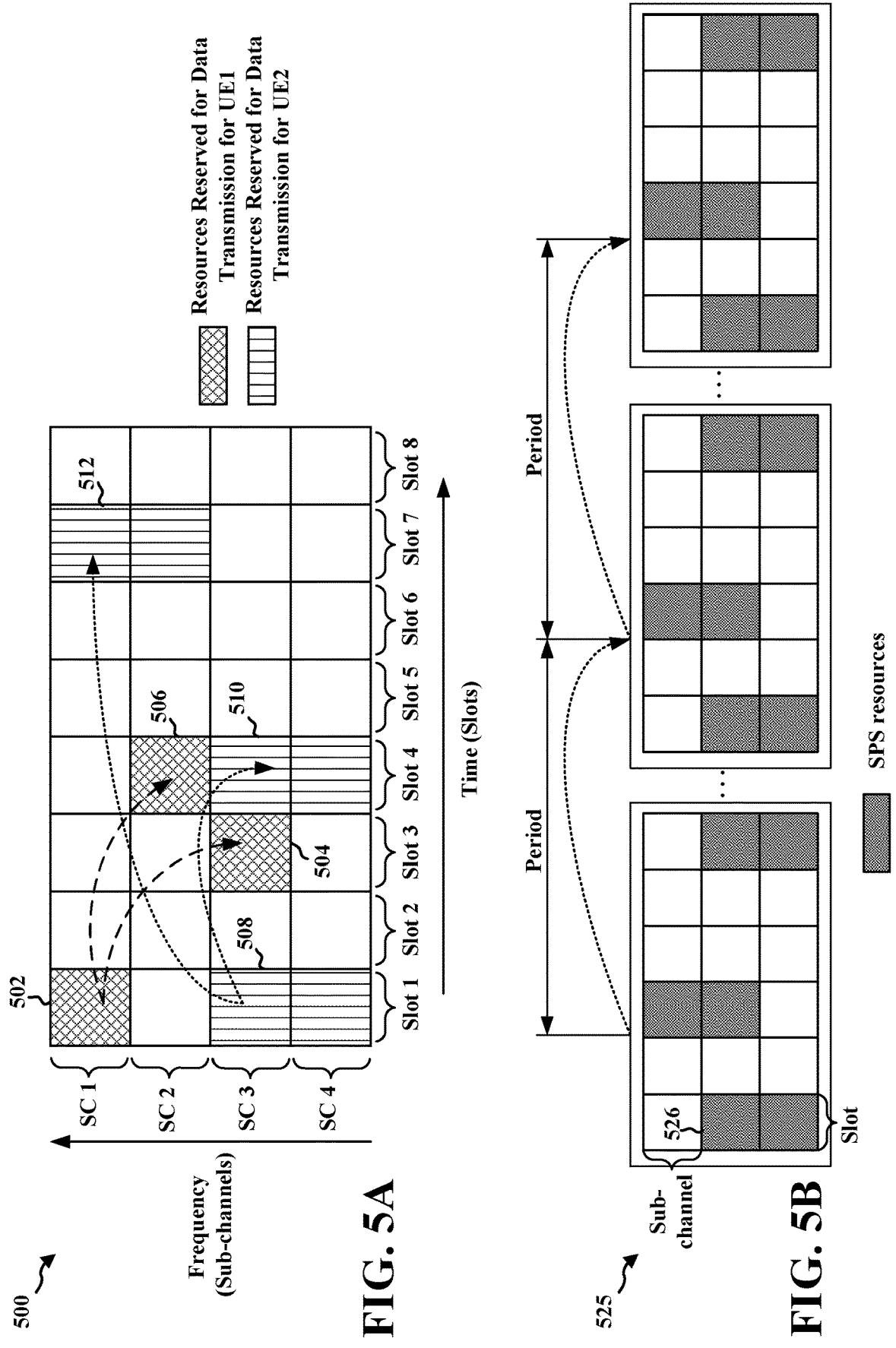
FIGS. 5A and 5B illustrate examples of resource reservation for sidelink communication.

Sidelink resource reservations may be periodic or aperiodic. FIG. 5A illustrates an example 500 of time and frequency resources showing aperiodic reservations for sidelink transmissions. FIG. 5B illustrates an example 525 of periodic reservations for sidelink transmissions. The resources may be comprised in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of time or slots. The initial candidate set of potential resources for a sidelink transmission may include 8 slots by 4 sub-channels, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 5A illustrates that a second UE ("UE2") reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5A. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5A illustrates resources being reserved for an initial transmission and two retransmissions, the reservation may be for an initial transmission and a single transmission or only for an initial transmission.

FIG. 5B illustrates an example 525 of a periodic resource reservation. Periodic resource reservation and signaling may be disabled by configuration. A period, with configurable values, may be signaled in SCI. As an example, a period may have a value between 0 ms and 1000 ms. Sidelink resources may be reserved periodically, such as for SPS resources. In SPS, initial transmissions of a subsequent period in an SPS flow may be protected by an earlier SPS transmission. FIG. 5B illustrates an initial transmission may indication a resource reservation, e.g., at 526, for the SPS resources. Then, the reservation of the SPS resources in subsequent periods may be indicated by a prior SPS transmission. Transmitting a self-reservation for the initial SPS transmission of SPS traffic in subsequent periods may be redundant to the reservation indication by the prior SPS transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is potentially distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5A, the UE may transmit SCI reserving resources for data transmissions 508, 510, and 512.

There may be a timeline for a sensing-based resource selection. For example, the UE may sense and decode the SCI received from other UEs during a sensing window, e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

Figure 6:
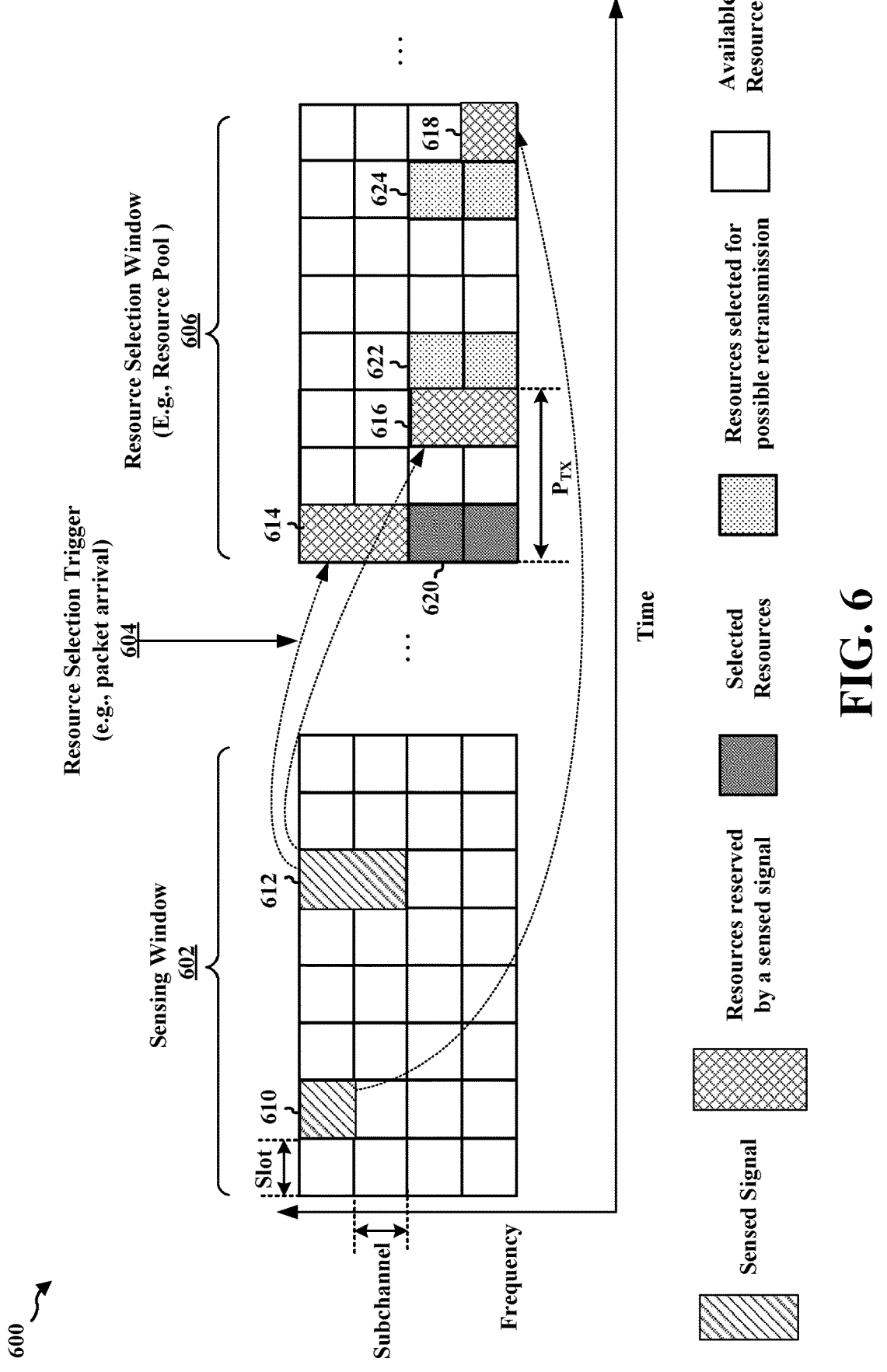
FIG. 6 is an example time diagram for sidelink resource selection.

FIG. 6 illustrates an example timeline 600 for sidelink resource selection based on sensing. In FIG. 6, the UE may receive sidelink transmission 610 and sidelink transmission 612 during the sensing window 602. FIG. 6 illustrates an example sensing window including 8 consecutive time slots and 4 consecutive sub-channels, which spans 32 resource blocks. The sidelink transmission 610 indicates a resource reservation for resource 618, and sidelink transmission 612 indicates a resource reservation for resources 614 and 622. For example, the sidelink transmissions 610 and 612 may each include SCI that indicates the corresponding resource reservation. Resource reservations may be periodic or aperiodic. Different reservations of resources may have different priority levels, e.g., with the priority level indicated in the SCI.

A UE receiving the transmissions 610 and 612 may exclude the resources 614, 616, and 618 as candidate resources in a candidate resource set based on the resource selection window 606. In some examples, the sidelink device may exclude the resources 614, 616, or 618 based on whether a measured RSRP for the received SCI (e.g., in 610 or 612) meets a threshold. When a resource selection trigger occurs at 604, such as the sidelink device having a packet for sidelink transmission, the sidelink device may select resources for the sidelink transmission (e.g., including PSCCH and/or PSSCH) from the remaining resources of the resource pool within the resource selection window 606 after the exclusion of the reserved resources (e.g., 614, 616, and 618). FIG. 6 illustrates an example in which the sidelink device selects the resource 620 for sidelink transmission. The sidelink device may also select resources 622 and/or 624 for a possible retransmission. After selecting the resources for transmission, the sidelink device may transmit SCI indicating a reservation of the selected resources. Thus, each sidelink device may use the sensing/reservation procedure to select resources for sidelink transmissions from the available candidate resources that have not been reserved by other sidelink devices In some instances, multiple UEs may transmit at the same time and may not receive the overlapping communication (e.g., SCI indicating resource reservations) from each other and/or from a base station. Such a UE may miss or be unaware of transmissions and sidelink reservations by other UEs. Therefore, two UEs may reserve the same resource block for a future sidelink transmission, which may result in a resource collision. A resource collision occurs for sidelink transmissions that overlap at least partially in time, and which may overlap, at least partially, in frequency.

Figure 7:
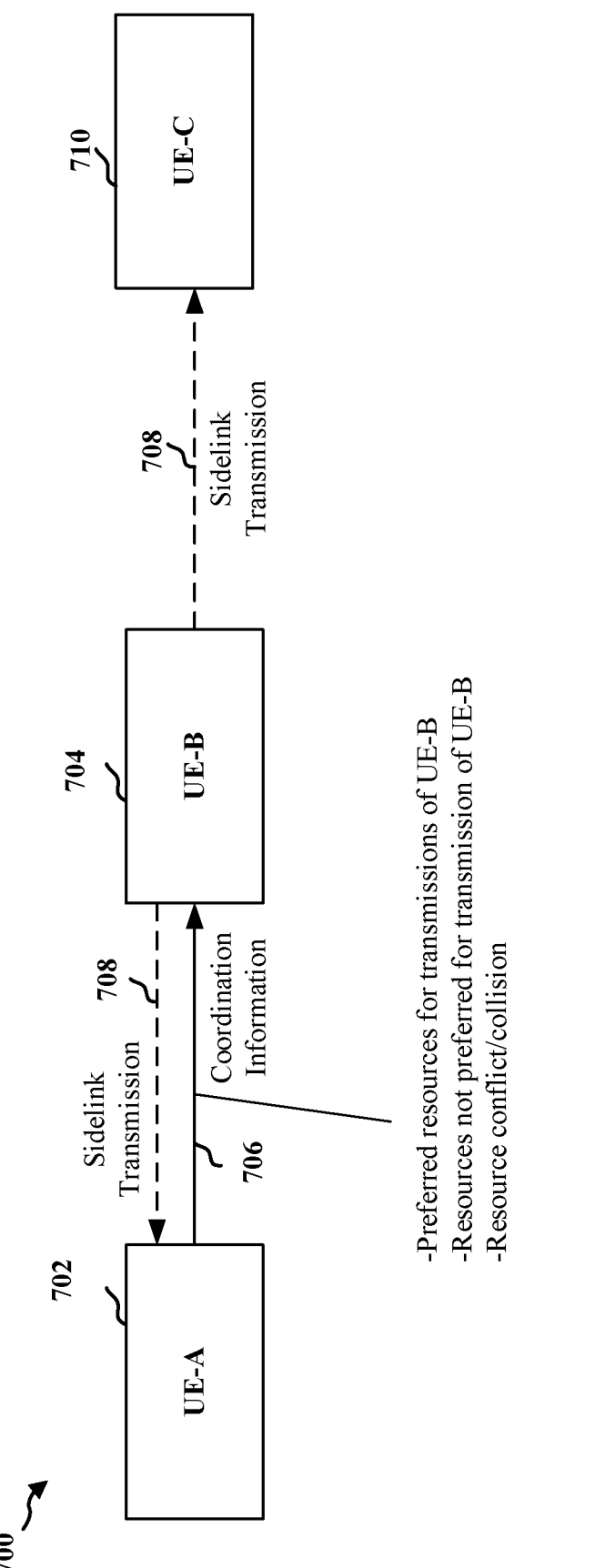
FIG. 7 illustrates an example of inter-UE coordination for sidelink communication.

To reduce or avoid resource collisions under such instances, and to improve sidelink communication among UEs, the UEs may coordinate among themselves by generating and sharing inter-UE coordination information with other UEs. FIG. 7 is a diagram 700 illustrating the exchange of inter-UE coordination information, where a first UE ("UE-A") 702 transmits inter-UE coordination information 706 to a second UE ("UE-B") 704. In some aspects, the transmission of inter-UE coordination information may include resource reservation forwarding by the UE-A.

The inter-UE coordination information 706 may include information based on the UE's sensing information (e.g., resource reservations of other UEs that are sensed by UE 702 (e.g., UE-A)), inter-UE coordination information from another UE, resources that are bad, undesirable, or non-preferred for the UE-A 702 (e.g., resources subject to high interference), resources which are preferred or better than other resources for the UE-A 702, etc.

The inter-UE coordination information 706 may indicate candidate resources for sidelink transmission or preferred resources for transmissions by UE-B 704. In some aspects, the indication of preferred resources for UE-B's transmission may be referred to as "Type A" inter-UE coordination information. The UE-A 702 may use the inter-UE coordination information 706 to inform the UE-B 704 about which sub-channels and slots may be used for communicating with the UE-A 702 and/or which sub-channels and slots may not be used because they are occupied or reserved by the UE-A 702 and/or other UEs. The UE-A may indicate a set of resources that may be more suitable for UE-B's transmission based on UE-A's evaluation. The candidate resources may indicate a group of resources from which the UE-B 704 (e.g., UE-B) may select for the sidelink transmission 708. As illustrated, the sidelink transmission 708 may be for UE-A 702 or for one or more different UEs, e.g., UE-C 710. In some aspects, the UE-A may be a potential receiver of the UE-B's transmission, and the inter-UE coordination information may enable mode 2 resource allocation that is based on resource availability from a potential receiver's perspective, which may address reception challenges for a hidden node. In some aspects, the inter-UE coordination information 706 may indicate resources for a sidelink transmission, e.g., particular resources on which the UE-B 704 is to transmit the sidelink transmission 708 rather than candidate resources that the UE-B 704 may select.

In some aspects, the inter-UE coordination information 706 may indicate a set of resources that may not be preferred for UE-B's transmission, such as resources that may not be available for UE-B to transmit a sidelink transmission based on the UE-A's evaluation. In some aspects, the indication of non-preferred resources for UE-B's transmission may be referred to as "Type B" inter-UE coordination information.

In some aspects, the inter-UE coordination information 706 may indicate a half-duplex conflict. For example, the inter-UE coordination information 706 may indicate a collision in time and/or frequency for two transmitting UEs that are unable to receive the other, respective transmission in a half-duplex mode. In some aspects, the inter-UE coordination information 706 may indicate a collision of resources (e.g., reserved resources) in time and/or frequency. In some aspects, the indication of a collision/conflict in resources may be referred to as "Type C" inter-UE coordination information.

Based at least in part on the inter-UE coordination information 706 from the UE-A 702, the UE-B 704 may make a better decision on which resources to use and/or reserve for its sidelink transmission 708 to avoid resource collisions.

The UE-A 702 may share its inter-UE coordination information 706 with multiple UEs, and the UE-B 704 may receive the inter-UE coordination information 706 from multiple UEs. Inter-UE coordination information 706 may be transmitted in any of various ways.

The UE-A 702 may transmit inter-UE coordination information 706 in a PSFCH, e.g., indicating a resource collision or a half-duplex conflict indication. The UE-A 702 may transmit inter-UE coordination information 706 in SCI. For example, the UE-A 702 may transmit shared sensing information, candidate resource information for a sidelink transmission, or particular resources for a sidelink transmission in SCI-2 transmitted in PSSCH. For example, a first portion of SCI (e.g., SCI-1) may be transmitted in PSCCH, and a second portion of SCI (e.g., SCI-2) may be transmitted in PSSCH. The UE-A 702 may transmit inter-UE coordination information 706 in a MAC-CE, e.g., on the PSSCH. The UE-A 702 may transmit the inter-UE coordination information 706 in a new physical channel (e.g., that is different than PSCCH, PSSCH, PSFCH, etc.). For example, the UE-A 702 may transmit the inter-UE coordination information 706 in a physical channel that is configured for or dedicated to inter-UE configuration information. The UE-A 702 may transmit the inter-UE coordination information 706 in RRC signaling.

In some aspects, the UE-A 702 may transmit the inter-UE coordination information 706 periodically. In some aspects, the UE-A 702 may transmit aperiodic inter-UE coordination information 706 in response to a trigger. Among other examples, the trigger may be based on the occurrence of an event, such as the occurrence of/detection of a resource collision, the occurrence of/detection of a half-duplex conflict, etc. For example, if the UE-A 702 detects a resource collision, the UE-A 702 may respond by transmitting inter-UE coordination information 706.

In a first scheme, the coordination information 706 sent from UE-A 702 to UE-B 704 is the set of resources preferred and/or non-preferred for UE-B's transmission 708. In some aspects. In some aspects, the inter-UE coordination information 706 may include additional information other than indicating time/frequency of the resources within the set in the coordination information.

In a second scheme, the inter-UE coordination information 706 from UE-A 702 to UE-B 704 indicates the presence of an expected/potential and/or detected resource conflict on the resources indicated by an SCI from UE-B 704.

The UE-B 704 may utilize the inter-UE coordination information 706 in various ways.

If the inter-UE coordination information 706 includes information based on the first scheme (e.g., resources that are preferred for transmissions of the UE-B 704 and/or resources that are not preferred for transmissions of the UE-B 704), the UE-B 704 may select resource(s) to be used for its sidelink transmission resource selection, or resource re-selection, may be based on both UE-B's sensing result (if available) and the received inter-UE coordination information 706 according to a first option. In a second option, the UE-B 704 may select resource(s) to be used for its sidelink transmission resource selection, or resource re-selection, may be based on the received inter-UE coordination information 706 and not based on sensing. In a third option, the UE-B 704 may select resource(s) to be used for its sidelink transmission resource selection, or resource re-selection, may be based on the received inter-UE coordination information 706 (which may allow the UE-B to use or not use sensing in combination with the inter-UE coordination information 706)

If the inter-UE coordination information 706 includes information based on the second scheme (e.g., information indicating a resource conflict), the UE-B 704 may determine resources to be re-selected based on the received inter-UE coordination information 706. The UE-B 704 may determine whether to perform a retransmission based on the received inter-UE coordination information 706. In some aspects, the UE-B 704 may use sensing information in combination with the inter-UE coordination information 706 to determine resources to be re-selected and/or to determine whether to perform a retransmission.

In a first inter-UE coordination scheme, the coordination information that is sent from UE-A to UE-B may include the set of resources that are preferred or non-preferred for the UE-B's transmission. Down selection may be performed between the preferred resource set and the non-preferred resource set. The inter-UE coordination information may indicate a time/frequency of the resources within the set and may further include additional information.

In a second inter-UE coordination scheme, the coordination information that is sent from the UE-A to the UE-B may include the presence of expected/potential and/or detected resource conflicts on the resources indicated by SCI from the UE-B. In some aspects, down-selection may be performed between the expected/potential conflict and the detected resource conflict.

In some aspects, the UE-A that transmits the inter-UE coordination information to the UE-B may be a particular UE, such as an intended receiver of UE-B. In some aspects, any UE may transmit inter-UE coordination information. In some aspects, a UE may be configured, such as in a higher-layer configuration, to transmit inter-UE coordination information.

A UE's reservation of resources for its own transmission may be referred to as a self-reservation. A self-reservation may correspond to resources that the UE has selected but not yet signaled through a first transmission of an aperiodic transmission or a first SPS transmission. Information about reservations from other sidelink transmitters can be transmitted along with a UE's self-reservation. The inclusion of the sidelink reservation information from other UEs, including inter-UE coordination information, may be referred to as "piggy backing" the information with the UE's self-reservation. The resource reservation forwarding may help to protect unreserved initial transmissions. For example, the UE may send the self-reservation when it has resources selected but not signaled.

For aperiodic resource reservations, each UE may announce its self-reservation. The self-reservation transmissions may collide with each other, and information may not be received by other UEs. One or more of the UEs (and in some examples, each UE) may include (piggyback or retransmit) reservations from other nearby UEs when transmitting their self-reservation. The inclusion, or forwarding, of reservation information from nearby UEs in the self-reservation helps to ensure that each UE receives the reservations of nearby UEs. The first transmission is now protected by the reservation, and the packet reception rate may be improved.

As discussed in connection with FIG. 5B, subsequent SPS resources may be protected, or otherwise indicated/reserved, by prior SPS transmissions. The transmission of a self-reservation for initiation transmissions of subsequent SPS periods may introduce redundant signaling and increased overhead. If the self-reservation is not transmitted, the inter-UE coordination information or other reservation information may not be forwarded/piggy backed with the self-reservation. The reduction in inter-UE coordination information may reduce coordination reliability.

Figure 8:
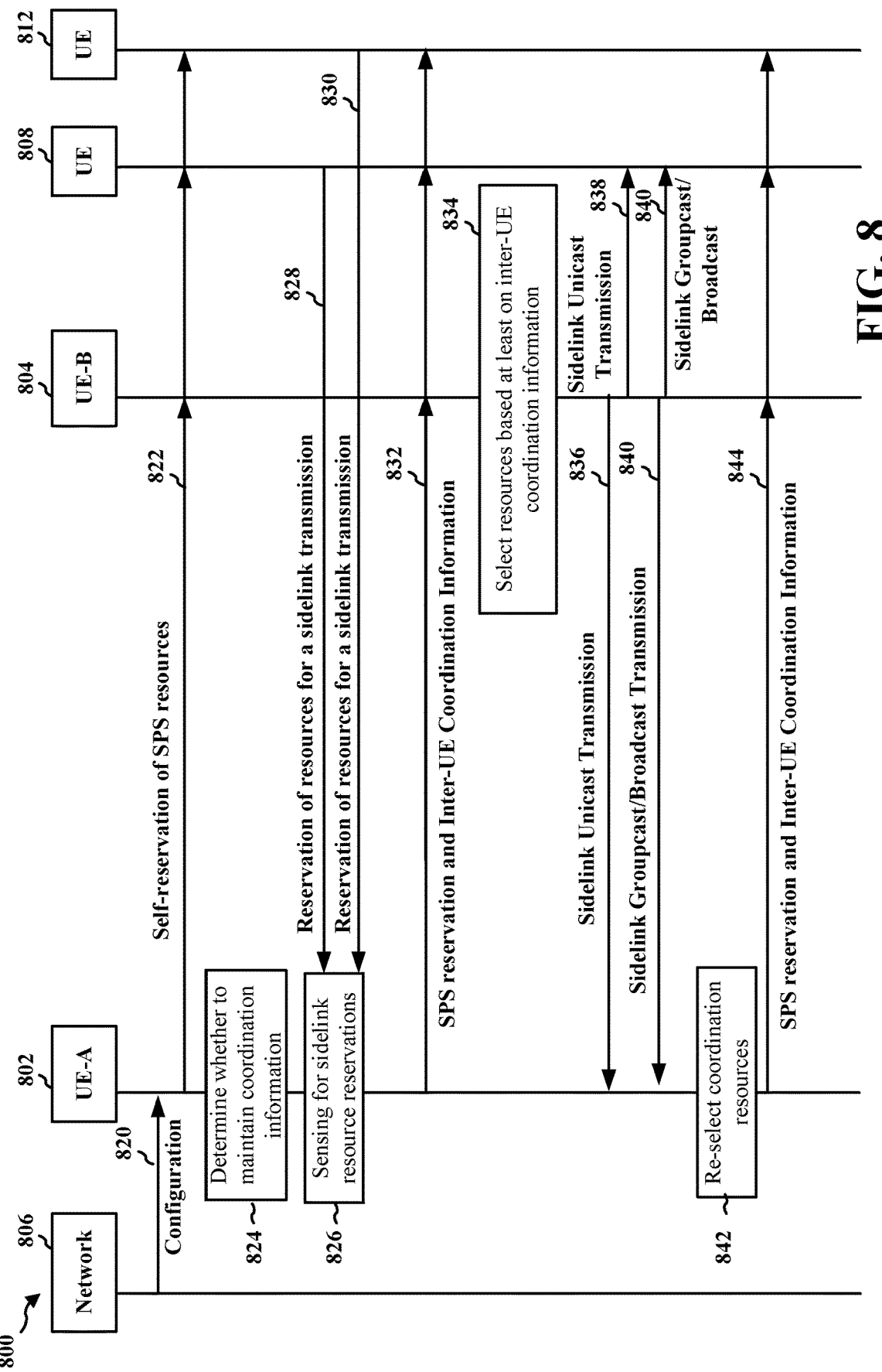
FIG. 8 is a communication flow between UEs that includes the exchange of inter-UE coordination information.

The present disclosure provides aspects to balance a reduction in self-reservation for SPS resources (and a corresponding reduction in inter-UE coordination information) with maintaining some reservation forwarding (e.g., forwarding inter-UE coordination information) to improve coordination reliability. FIG. 8 illustrates an example communication flow 800 including the determination of whether to forward, or otherwise transmit, inter-UE coordination information for sidelink communication along with an SPS self-reservation. The UE 802 may correspond to the UE-A 702 in FIG. 7, and the UE 804 may correspond to the UE-B in FIG. 7.

A UE 802 may transmit a self-reservation 822 for a first transmission in an SPS flow, such as described in connection with FIG. 5B. For subsequent SPS transmissions, the UE may determine, at 824, whether to maintain, and transmit, inter-UE coordination information based on a threshold value. The threshold value may be referred to as a probability threshold. The UE may forward its resource reservation information and the resource reservation for other transmitters via an inter-UE coordination message if a calculated probability value is higher than a threshold. The calculated probability value indicates how likely this UE would be to forward the resource reservation information. A higher threshold value may correspond to a lower likelihood that the UE will forward the resources reservation information. If the threshold value, or threshold condition, is met the UE may transmit a self-reservation for a subsequent SPS period and may include inter-UE coordination information in the transmission.

In some aspects, the probability threshold may have a value that is configured for the UE at 820. For example, a network 806 may configure the threshold value for the UE 802. In some aspects, the UE 802 may determine the threshold value, e.g., based on a condition or at least one criteria or metric.

The probability threshold and/or the probability value observed by the UE may be based on a condition or a combination of multiple criteria. The condition/criteria may be based on a channel busy ratio (CBR) level. For example, a higher CBR may correspond to a smaller probability value calculated by the UE to save the transmission effort and channel loading. A lower CBR may correspond to a higher probability value calculated by the UE. The condition/criteria may be based on a channel occupancy in inter-UE coordination dedicated resources. For example, higher channel occupancy in inter-UE coordination dedicated resources may correspond to a lower probability value calculated by the UE, and lower channel occupancy may correspond to a higher probability value calculated by the UE. The relationship to channel occupancy may save dedicated resources as SPS resource reservation may be considered to be a lower priority transmission compared to aperiodic traffic reservation information. The condition/criteria may be based on a geographic location/position of the UE 802. For example, if a UE is close to a particular location such as a crossroad, the probability value calculated by the UE may be higher, or the probability threshold may be lower, in order to ensure the reliability. The condition/criteria may be based on a resource collision ratio level. For example, if the UE 802 observes a higher collision level locally, the probability threshold may be set to reduce the resources reservation forwarding that the UE 802 sends. Similarly, the probability value calculated by the UE may be lower, which corresponds to a lower likelihood of forwarding. If the UE 802 observes lower collisions, the probability threshold may be set to increase reservation forwarding by the UE 802. Similarly, the probability value calculated by the UE may be higher, which corresponds to a higher likelihood of forwarding. The condition/criteria may be based on a number of inter-UE coordination transmissions sent by the same UE over a period of time. For example, the more times that the UE 802 receives inter-UE coordination information from the same UE (e.g., one of UE 808 or 810), the UE 802 may be less likely to forward/maintain the reservation information. Similarly, the probability value calculated by the UE may be lower, which corresponds to a lower likelihood of forwarding. The probability threshold may be adjusted to increase the UE's reservation forwarding if the UE 802 receives less reservations/inter-UE coordination information from the second UE within the period of time. Similarly, the probability value calculated by the UE may be higher, which corresponds to a higher likelihood of forwarding.

The UE's calculation of a probability value, for comparison to the threshold, can be based on any combination of one or more of the metrics. As an example, the UE may calculate a forwarding probability value as a function (f)=f(CBR, UE geographic position, resource collision ratio level, a number of inter-UE coordination transmissions sent by the same UE in a time window, etc.). The function algorithm may include weights for one or more of the metrics involved in the function. The function algorithm and/or the weights for each factor in the algorithm may be applied by the UE without signaling from a network, in some aspects. In other aspects, a network may configure the function algorithm and/or the weights for each factor in the algorithm for the UE. The UE may determine the probability value based on the function and may compare the probability value to the probability threshold to determine whether to forward the inter-UE coordination information. In some aspects, the probability threshold may be configured for the UE, such as by the network. In other aspects, the UE may determine the probability threshold.

If the UE 802 determines to maintain or transmit the inter-UE coordination information, at 824, the UE 802 may perform sensing for sidelink resource reservations, at 826. The sensing may include aspects described in connection with any of FIG. 5A, 5B, or 6. FIG. 8 illustrates the UE 802 receiving reservation information 828 from UE 808 and reservation information 830 from the UE 812. The reservation information 828 and 830 may include self-reservations from the respective UEs and/or may include inter-UE coordination information. The UE 802 may receive sidelink reservation information from any number of UEs, e.g., one or more UEs.

Figure 9:
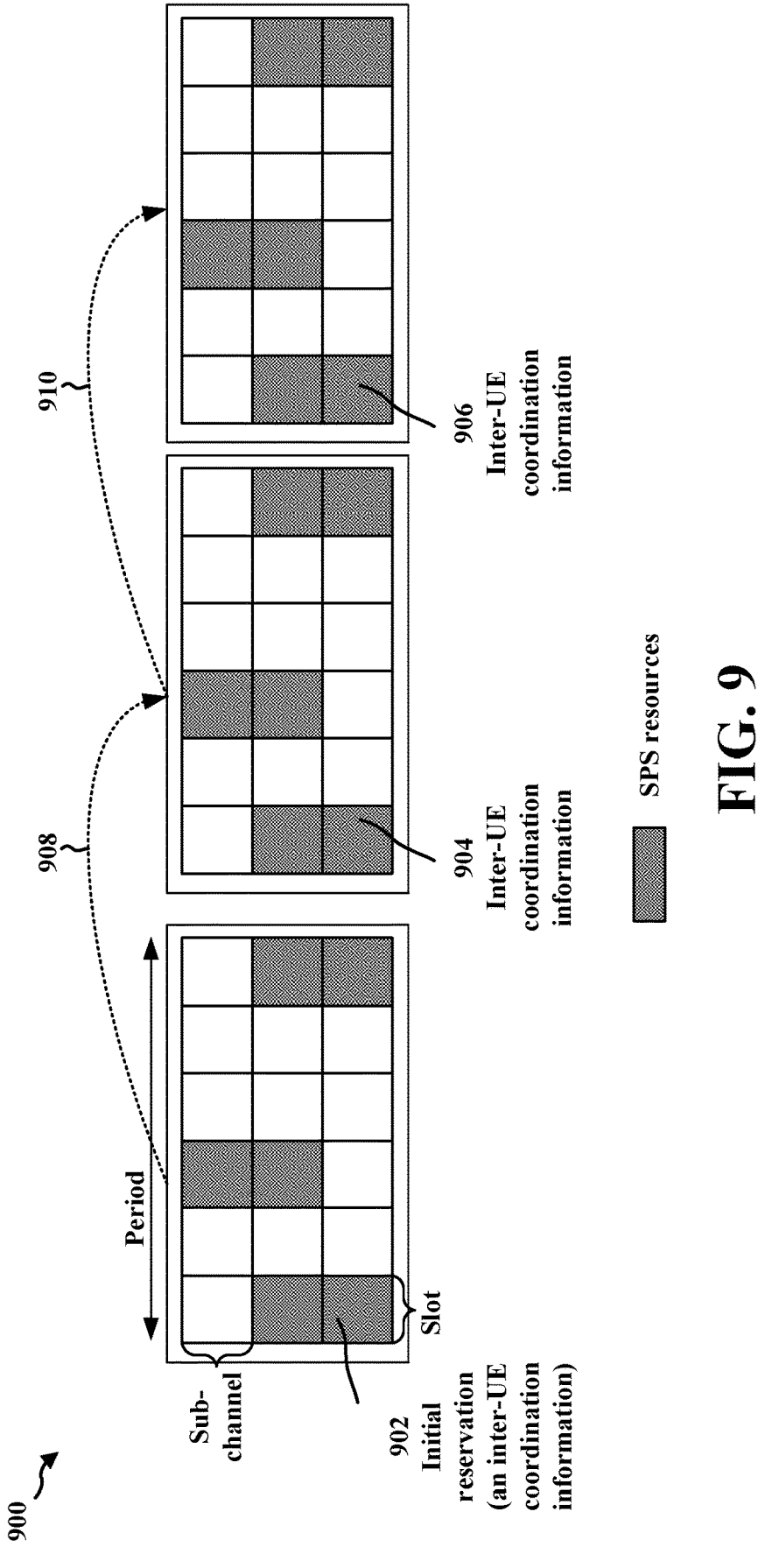
FIG. 9 are example time diagram for SPS sidelink transmission including inter-UE coordination information.

FIG. 8 illustrates the UE 802 transmitting the inter-UE coordination information 832. The UE 802 may transmit the inter-UE coordination information in combination with self-reservation of the SPS resources for its own periodic sidelink transmissions. The self-reservation with which the inter-UE coordination information 832 is transmitted may be a subsequent SPS period, which has already been indicated by the initial self-reservation of SPS resources, at 822, and/or by an SPS transmission in an earlier period. FIG. 9 illustrates an example resource diagram 900 showing resources for SPS sidelink transmission, e.g., by the UE 802. The UE may transmit a self-reservation for the SPS resources at 902 for an initial SPS transmission. As described in connection with FIG. 5B, the SPS transmission in an earlier period may indicate the SPS reservation for a subsequent period, as shown at 908, 910. Although the SPS resources are indicated by the SPS transmission in an earlier period, the UE may transmit inter-UE coordination information 904 and/or 906 in subsequent periods of the SPS resources. In some aspects, the UE may transmit the inter-UE coordination information 904 and/or 906 with SPS self-reservation information. In some aspects, the UE may transmit the inter-UE coordination information 904 and/or 906 without a self-reservation of the SPS resources.

One or more UEs may use the inter-UE coordination information to select resources for sidelink transmissions. As an example, the UE 804 may use the inter-UE coordination information 832 to select resources for sidelink transmission. The type of inter-UE coordination information and the use of the inter-UE coordination information may include any of the aspects described in connection with FIG. 7. The UE 804 may then transmit a sidelink unicast transmission 836 or 838 or a sidelink groupcast or broadcast transmission 840 using the resources selected at 834.

If the UE 802 determines to maintain, and forward, inter-UE coordination information, the UE 802 may reserve resources to transmit the inter-UE coordination information based on a periodicity of SPS packet transmissions. For example, the periodicity of the inter-UE coordination information may be the same as the periodicity of the SPS packet transmission. In the example in FIG. 9, if the UE transmits the inter-coordination information at 904 and 906, the transmission is based on the periodicity of the SPS transmissions. In some aspects, the periodicity of the inter-UE coordination information may be a multiple of the periodicity of the SPS packet transmission. If the period for the SPS packet transmission corresponds to P, the period for the transmission of the inter-UE coordination information may correspond to k*P, with k being an integer value. As an example, if the value of k is 2, the UE may transmit the inter-UE coordination information at 906 in FIG. 9 but not at 904. The value of k may be based on the probability threshold. For example, the value of k may reduce the number of transmissions if the probability of reservation forwarding is low.

The UE 802 may re-select inter-UE coordination information resources, at 842. The UE may then transmit the inter-UE coordination information 844 In some aspects, the UE 802 may re-select the inter-UE coordination resources each time SPS resources are re-selected. The re-selection may include stopping transmission of the inter-UE coordination information. Thus, in response to the re-selection of SPS resources, the UE 802 may determine whether to maintain and transmit inter-UE coordination information, such as described in connection with 824. In some aspects, the UE 802 may have been transmitting inter-UE coordination information based on the probability value and may determine to stop maintaining and transmitting the inter-UE coordination information based on the probability value when SPS resources are re-selected. In other aspects, the UE 802 may have not been transmitting inter-UE coordination information based on the probability value and may determine to start maintaining and transmitting the inter-UE coordination information based on the probability value when SPS resources are re-selected.

In some aspects, the UE 802 may re-select the inter-UE coordination resources before SPS resources are re-selected. The re-selection may include stopping transmission of the inter-UE coordination information. The re-selection of the inter-UE coordination information resources before the SPS resource re-selection may provide hopping of the self-reservation transmission to avoid persistent collisions.

In some aspects, the UE 802 may re-select the inter-UE coordination resources, to be transmitted with SPS self-reservation, the re-selection being independent from the SPS packet transmission. The re-selection may include stopping transmission of the inter-UE coordination information. The independent re-selection of the inter-UE coordination resources may enable hopping of self-reservation and packet transmissions to avoid persistent collisions.

Figure 10:
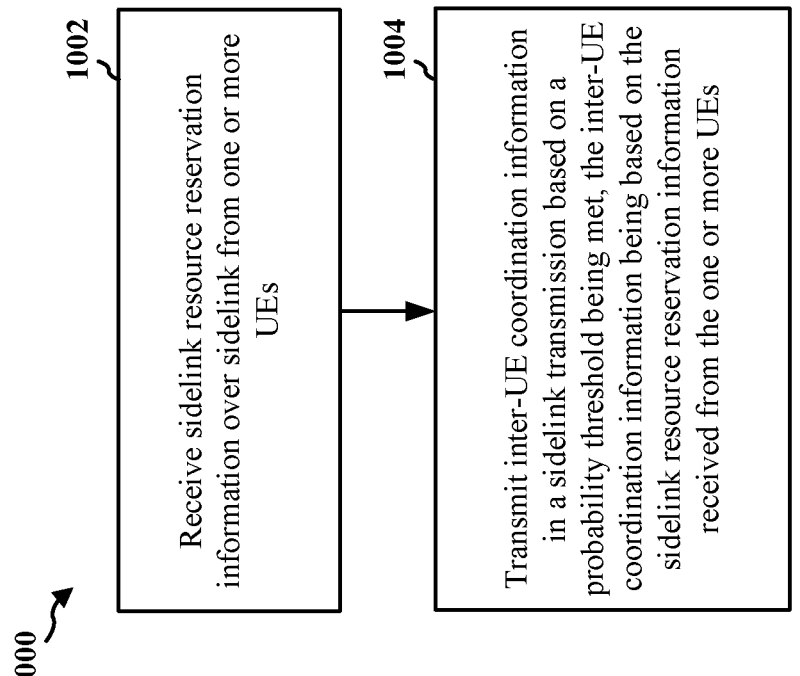
FIG. 10 is a flowchart of a method of wireless communication including the transmission of inter-UE coordination information.

FIG. 10 is a flowchart 1000 of a method of wireless communication. The method may be performed by a UE (e.g., the UE 104, the UE-A 702 or 802; or the apparatus 1302). The method may enable the UE to balance the reduced reservation signaling associated with SPS resources with maintaining at least some inter-UE coordination information for improved reliability of sidelink communication.

At 1002, the UE receives sidelink resource reservation information over sidelink from one or more UEs. FIG. 8 illustrates an example of reception of sidelink resource reservation information 828 and 830. The reception may be performed, e.g., by the reception component 1230 of the apparatus 1202 in FIG. 12.

At 1004, the UE transmits inter-UE coordination information in a sidelink transmission based on a probability threshold being met. The inter-UE coordination information is based on the sidelink resource reservation information received from the one or more UEs. FIG. 8 illustrates an example of transmission of inter-UE coordination information 832. The transmission may be performed, e.g., by the transmission component 1234 of the apparatus 1202 in FIG. 12. A value of the probability threshold is based on one or more of a CBR, a channel occupancy threshold, a geographic position of the first UE, a resource collision ratio, or an amount of received inter-UE coordination information from a second UE over a period of time, e.g., as described in connection with FIG. 8. The first UE may receive a configuration of the probability threshold, e.g., from a network or other device. The first UE may transmit the inter-UE coordination information based on a periodicity of SPS resources reserved by the first UE. The first UE may transmit the inter-UE coordination information based on an integer multiple of the periodicity of the SPS resources.

FIG. 11 is a flowchart 1100 of a method of wireless communication. The method may be performed by a UE (e.g., the UE 104, the UE-A 702 or 802; or the apparatus 1302). The method may enable the UE to balance the reduced reservation signaling associated with SPS resources with maintaining at least some inter-UE coordination information for improved reliability of sidelink communication.

At 1108, the UE receives sidelink resource reservation information over sidelink from one or more UEs. FIG. 8 illustrates an example of reception of sidelink resource reservation information 828 and 830. The reception may be performed, e.g., by the sensing component 1240 of the apparatus 1202 in FIG. 12.

As illustrated at 1104, the UE may transmit an initial reservation for SPS resources reserved for transmission by the first UE. As illustrated at 1106, the UE may transmit prior inter-UE coordination information in the initial reservation. The transmission may be performed, e.g., by the SPS resource component 1242 of the apparatus 1202 in FIG. 12.

As illustrated at 1110, the UE may determine whether to transmit inter-UE coordination information after the initial SPS reservation based on a probability threshold. The determination may be performed, e.g., by probability component 1246 of the apparatus 1202 in FIG. 12.

At 1112, the UE transmits inter-UE coordination information in a sidelink transmission based on a probability threshold being met. The inter-UE coordination information is based on the sidelink resource reservation information received from the one or more UEs. FIG. 8 illustrates an example of transmission of inter-UE coordination information 832. The transmission may be performed, e.g., by the inter-UE coordination information component 1244 and/or the transmission component 1234 of the apparatus 1202 in FIG. 12. A value of the probability threshold is based on one or more of a CBR, a channel occupancy threshold, a geographic position of the first UE, a resource collision ratio, or an amount of received inter-UE coordination information from a second UE over a period of time, e.g., as described in connection with FIG. 8. The first UE may receive a configuration of the probability threshold, e.g., from a network or other device, as illustrated at 1102. The first UE may transmit the inter-UE coordination information based on a periodicity of SPS resources reserved by the first UE. The first UE may transmit the inter-UE coordination information based on an integer multiple of the periodicity of the SPS resources.

As illustrated at 1114, the UE may skip transmission of the inter-UE coordination information if the probability threshold is not met. As an example, the UE may skip transmission of subsequent inter-UE coordination information based on the probability threshold not being met. The skipping of the transmission may be performed, e.g., by the inter-UE coordination information component 1244 of the apparatus 1202 in FIG. 12.

As illustrated at 1116, the UE may re-select inter-UE coordination resources for transmission of the inter-UE coordination information. The re-selection may be performed, e.g., by the inter-UE coordination information component 1244 of the apparatus 1202 in FIG. 12. As an example, the UE may reselect the inter-UE coordination resources for transmission of the inter-UE coordination information based on reselection of an SPS resource. As another example, the UE may reselect the inter-UE coordination resources for transmission of the inter-UE coordination information prior to reselection of an SPS resource. As another example, the UE may reselect the inter-UE coordination resources for transmission of the inter-UE coordination information independent of SPS packet transmission. An example of resource reselection, or stopping, is described in connection with 842 in FIG. 8.

As illustrated at 1118, the UE may stop transmission of the inter-UE coordination information. As an example, the UE may stop transmission of the inter-UE coordination information based on reselection of an SPS resource. As another example, the UE may stop transmission of the inter-UE coordination information prior to reselection of an SPS resource. As another example, the UE may stop transmission of the inter-UE coordination information independent of SPS packet transmission. An example of resource reselection, or stopping, is described in connection with 842 in FIG. 8. The stopping of the transmission may be performed, e.g., by the probability component 1246 and/or the inter-UE coordination information component 1244 of the apparatus 1202 in FIG. 12.

Figure 12:
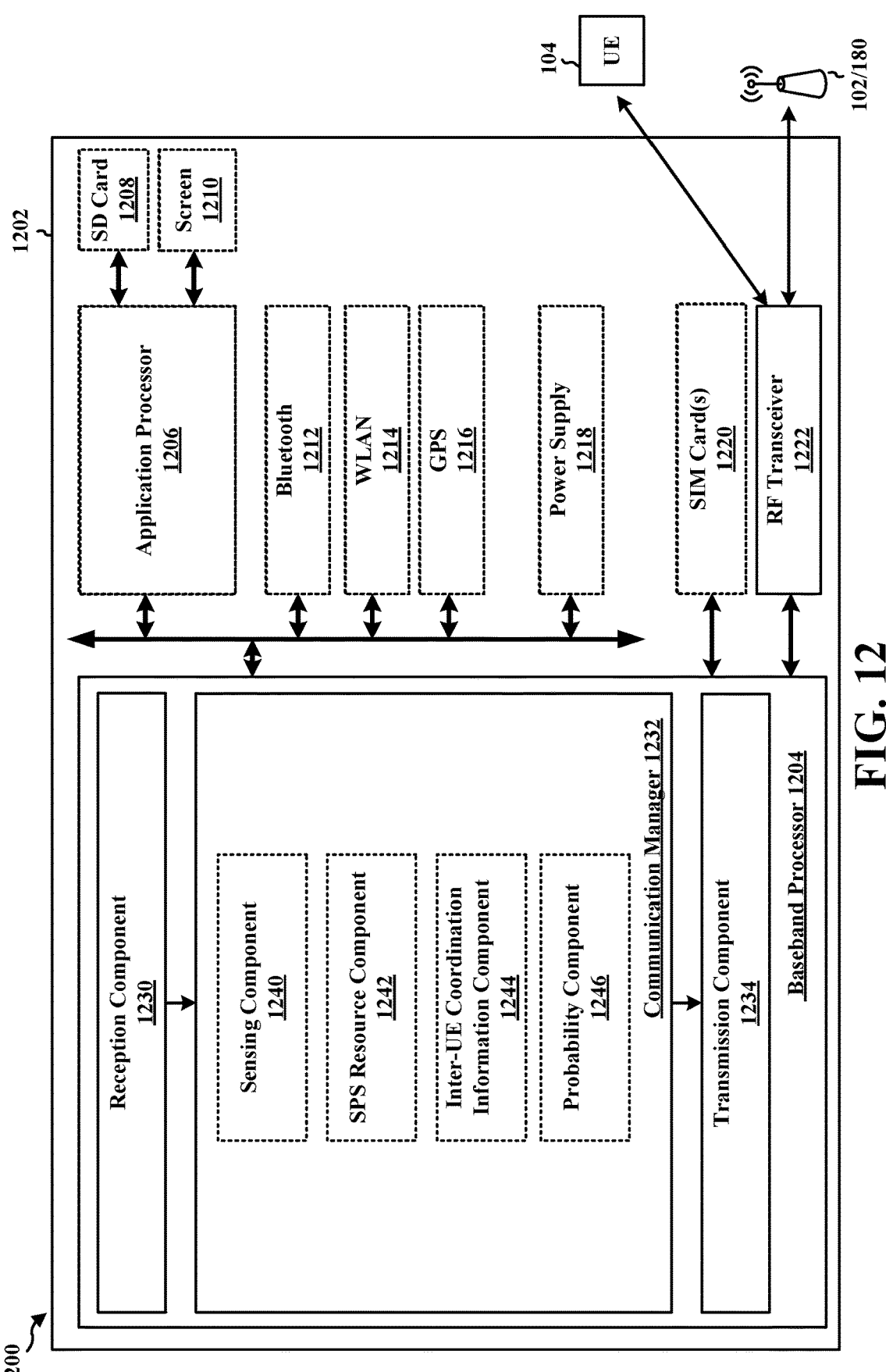
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, or another device configured to transmit and/or receive sidelink communication. The apparatus 1202 includes a baseband processor 1204 (also referred to as a modem) coupled to a RF transceiver 1222. In some aspects, the baseband processor 1204 may be a cellular baseband processor and/or the RF transceiver 1222 may be a cellular RF transceiver. The apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and/or a power supply 1218. The baseband processor 1204 communicates through the RF transceiver 1222 with the UE 104 and/or BS 102/180. The baseband processor 1204 may include a computer-readable medium/memory. The computer-readable medium/memory may be non-transitory. The baseband processor 1204 is responsible for general processing, including the execution of software stored on the computer-readable medium/memory. The software, when executed by the baseband processor 1204, causes the baseband processor 1204 to perform the various functions described in the present application. The computer-readable medium/memory may also be used for storing data that is manipulated by the baseband processor 1204 when executing software. The baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband processor 1204. The baseband processor 1204 may be a component of the device 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a sensing component 1240 configured to receives sidelink resource reservation information over sidelink from one or more UEs, e.g., as described in connection with 1002 in FIG. 10 or 1108 in FIG. 11. The communication manager 1232 includes an inter-UE coordination information component 1244 that is configured to transmit inter-UE coordination information in a sidelink transmission based on a probability threshold being met, e.g., as described in connection with 1004 in FIG. 10 or 1112 in FIG. 11. The communication manager 1232 further includes an SPS resource component 1242 that is configured to transmit an initial reservation for SPS resources reserved for transmission by the first UE, e.g., as described in connection with 1104 and/or 1106 in FIG. 11. The communication manager 1232 further includes a probability component 1246 that is configured to determine whether to maintain or transmit inter-UE coordination information in subsequent SPS periods based on whether a probability threshold is met, e.g., as described in connection with 1110 in FIG. 11. In some aspects, the inter-UE coordination information component 1244 and/or the probability component 1246 may be configured to re-select resources for the inter-UE coordination information and/or to stop the inter-UE coordination information as described in connection with 1116 or 1118 in FIG. 11.

The apparatus may include additional components that perform each of the blocks of the algorithm in the flowcharts of FIG. 10 or 11 and/or the aspects performed by the UE 802 in 8. As such, each block in the flowchart of FIG. 10 or 11 and/or the aspects performed by the UE 802 in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for imple-
mentation by a processor, or some combination thereof.

In one configuration, the apparatus 1202, and in particular
the baseband processor 1204, includes means for receiving
sidelink resource reservation information over sidelink from
one or more UEs and means for transmitting inter-UE
coordination information in a sidelink transmission based on
a probability threshold being met, the inter-UE coordination
information being based on the sidelink resource reservation
information received from the one or more UEs. The appa-
ratus 1202 may further include means for transmitting an
initial reservation for SPS resources reserved for transmis-
sion by the first UE, where the first UE transmits the
inter-UE coordination information after the initial reserva-
tion. The apparatus 1202 may further include means for
transmitting prior inter-UE coordination information in the
initial reservation. The apparatus 1202 may further include
means for skipping transmission of subsequent inter-UE
coordination information based on the probability threshold
not being met. The apparatus 1202 may further include
means for receiving a configuration of the probability
threshold. The apparatus 1202 may further include means
for reselecting inter-UE coordination resources for transmis-
sion of the inter-UE coordination information based on
reselection of an SPS resource. The apparatus 1202 may
further include means for stopping transmission of the
inter-UE coordination information based on reselection of
an SPS resource. The apparatus 1202 may further include
means for reselecting inter-UE coordination resources for
transmission of the inter-UE coordination information prior
to reselection of an SPS resource. The apparatus 1202 may
further include means for stopping transmission of the
inter-UE coordination information prior to reselection of an
SPS resource. The apparatus 1202 may further include
means for reselecting inter-UE coordination resources for
transmission of the inter-UE coordination information inde-
pendent of SPS packet transmission. The apparatus 1202
may further include means for stopping transmission of the
inter-UE coordination information independent of SPS
packet transmission. The means may be one or more of the
components of the apparatus 1202 configured to perform the
functions recited by the means. As described herein, the
apparatus 1202 may include the TX Processor 368, the RX
Processor 356, and the controller/processor 359. As such, in
one configuration, the means may be the TX Processor 368,
the RX Processor 356, and the controller/processor 359
configured to perform the functions recited by the means.

Figure 13:
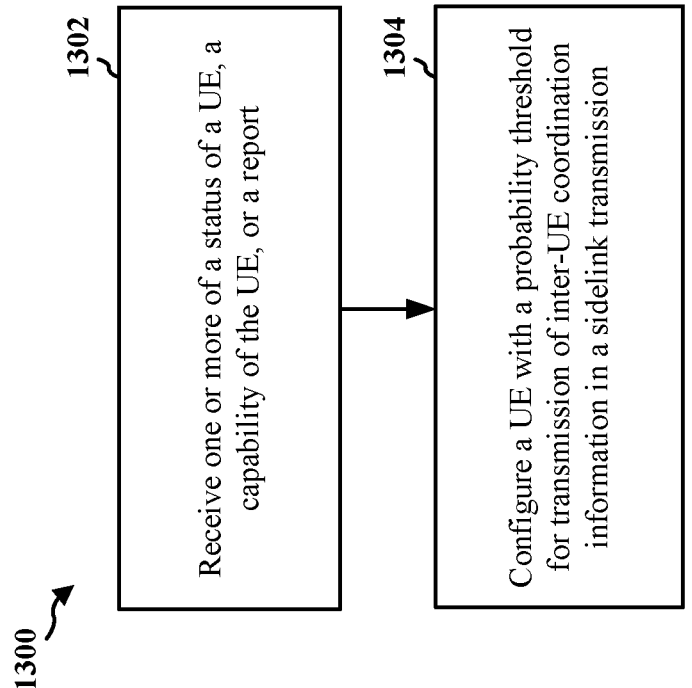
FIG. 13 is a flowchart of a method of wireless communication including a configuration of a probability threshold for the transmission of inter-UE coordination information.

FIG. 13 is a flowchart 1300 of a method of wireless
communication. The method may be performed by a net-
work device such as a base station (e.g., the network 806; or
the apparatus 1402). The method may enable a network to
control the amount of inter-UE coordination information
transmitted by a UE that transmits SPS sidelink transmis-
sions.

At 1302, the wireless device receives one or more of a
status of a UE, a capability of the UE, or a report. The
reception may be performed by any of the UE status
component 1440, the UE capability component 1442, or the
report component 1444 of the apparatus 1402 in FIG. 14.

At 1304, the wireless device configures a UE with a
probability threshold for transmission of inter-UE coordi-
nation information in a sidelink transmission. FIG. 8 illus-
trates an example of the transmission of a configuration 820
of a probability threshold. The configuration may be per-
formed by the probability configuration component 1446 of
the apparatus 1402 in FIG. 14. The sidelink transmission
may be based on a SPS reservation. The sidelink transmission may be a non-initial transmission of the SPS reserva-
tion. Examples of an SPS reservation are described in
connection with FIG. 5B, FIG. 8, and FIG. 9. The report that
is received at 1302 may include a CBR, and the probability
threshold is based on the CBR. The status of the UE that is
received at 1302 may include a coverage status of the UE,
and the probability threshold is based on the coverage status.

Figure 14:
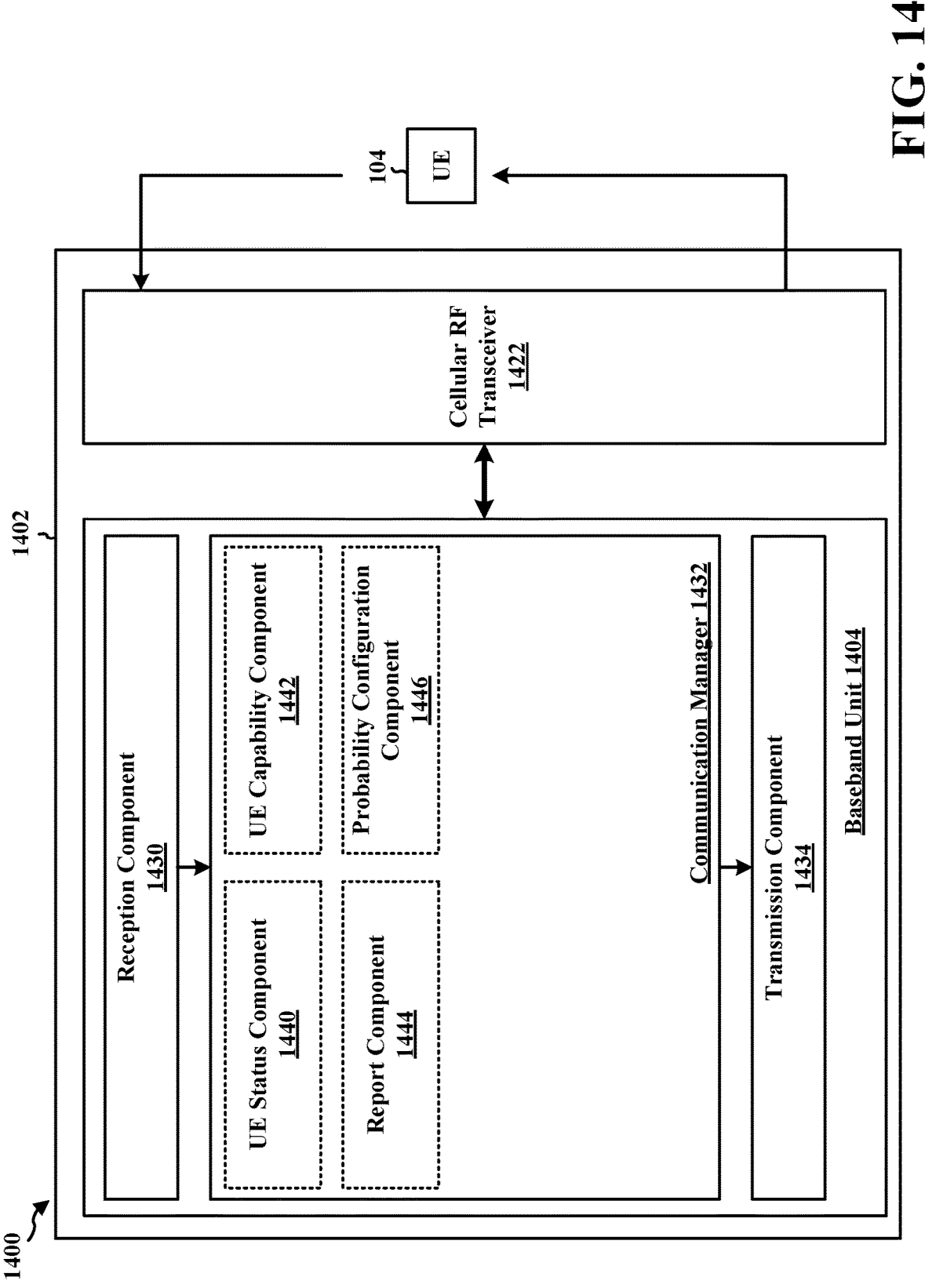
FIG. 14 is a diagram illustrating an example of a hardware implementation for an example apparatus.

FIG. 14 is a diagram 1400 illustrating an example of a
hardware implementation for an apparatus 1402. In some
aspects, the apparatus 1402 may be a base station, a com-
ponent of a base station, or may implement base station
functionality. The apparatus 1402 may include a baseband
unit 1404. The baseband unit 1404 may communicate
through a cellular RF transceiver 1422 with the UE 104. The
baseband unit 1404 may include a computer-readable
medium/memory. The baseband unit 1404 is responsible for
general processing, including the execution of software
stored on the computer-readable medium/memory. The soft-
ware, when executed by the baseband unit 1404, causes the
baseband unit 1404 to perform the various functions
described supra. The computer-readable medium/memory
may also be used for storing data that is manipulated by the
baseband unit 1404 when executing software. The baseband
unit 1404 further includes a reception component 1430, a
communication manager 1432, and a transmission compo-
nent 1434. The communication manager 1432 includes the
one or more illustrated components. The components within
the communication manager 1432 may be stored in the
computer-readable medium/memory and/or configured as
hardware within the baseband unit 1404. The baseband unit
1404 may be a component of the wireless device 310 and
may include the memory 376 and/or at least one of the TX
processor 316, the RX processor 370, and the controller/
processor 375.

The communication manager 1432 includes a UE status
component 1440, a UE capability component 1442, and/or a
report component 1444 that is configured to receive one or
more of a status of a UE, a capability of the UE, or a report,
e.g., as described in connection with 1302 in FIG. 13. The
communication manager 1432 includes a probability con-
figuration component 1446 that is configured to configure a
UE with a probability threshold for transmission of inter-UE
coordination information in a sidelink transmission, e.g., as
described in connection with 1304 in FIG. 13.

The apparatus may include additional components that
perform each of the blocks of the algorithm in the flowchart
of FIG. 13 and/or the aspects performed by the network 806
in FIG. 8. As such, each block in the flowchart of FIG. 13
and/or the aspects performed by the network 806 in FIG. 8
may be performed by a component and the apparatus may
include one or more of those components. The components
may be one or more hardware components specifically
configured to carry out the stated processes/algorithm,
implemented by a processor configured to perform the stated
processes/algorithm, stored within a computer-readable
medium for implementation by a processor, or some com-
bination thereof.

In one configuration, the apparatus 1402, and in particular
the baseband unit 1404, includes means for receiving one or
more of a status of a UE, a capability of the UE, or a report
and means for configuring the UE with a probability thresh-
old for transmission of inter-UE coordination information in
a sidelink transmission. The means may be one or more of
the components of the apparatus 1402 configured to perform
the functions recited by the means. As described herein, the
apparatus 1402 may include the TX Processor 316, the RX
Processor 370, and the controller/processor 375. As such, in one configuration, the means may be the TX Processor 316, the RX Processor 370, and the controller/processor 375 configured to perform the functions recited by the means It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Aspect 1 is a method of wireless communication at a first UE, comprising: receiving sidelink resource reservation information over sidelink from one or more UEs; and transmitting inter-UE coordination information in a sidelink transmission based on a probability threshold being met, the inter-UE coordination information being based on the sidelink resource reservation information received from the one or more UEs.

In aspect 2, the method of aspect 1 further includes transmitting an initial reservation for SPS resources reserved for transmission by the first UE, wherein the first UE transmits the inter-UE coordination information after the initial reservation.

In aspect 3, the method of aspect 2 further includes transmitting prior inter-UE coordination information in the initial reservation.

In aspect 4, the method of any of aspects 1-3 further includes skipping transmission of subsequent inter-UE coordination information based on the probability threshold not being met.

In aspect 5, the method of any of aspects 1-4 further includes receiving a configuration of the probability threshold.

In aspect 6, the method of any of aspects 1-5 further includes that a value of the probability threshold is based on one or more of: a CBR, a channel occupancy threshold, a geographic position of the first UE, a resource collision ratio, or an amount of received inter-UE coordination information from a second UE over a period of time.

In aspect 7, the method of any of aspects 1-6 further includes that the first UE transmits the inter-UE coordination information based on a periodicity of SPS resources reserved by the first UE.

In aspect 8, the method of aspect 7 further includes that the first UE transmits the inter-UE coordination information based on an integer multiple of the periodicity of the SPS resources.

In aspect 9, the method of aspect 7 or 8 further includes that inter-UE coordination resources for transmission of the inter-UE coordination information based on reselection of an SPS resource.

In aspect 10, the method of any of aspects 7 or 8 further includes that stopping transmission of the inter-UE coordination information based on reselection of an SPS resource.

In aspect 11, the method of aspect 7 or 8 further includes reselecting inter-UE coordination resources for transmission of the inter-UE coordination information prior to reselection of an SPS resource.

In aspect 12, the method of aspect 7 or 8 further includes stopping transmission of the inter-UE coordination information prior to reselection of an SPS resource.

In aspect 13, the method of aspect 7 or 8 further includes reselecting inter-UE coordination resources for transmission of the inter-UE coordination information independent of SPS packet transmission.

In aspect 14, the method of aspect 7 or 8 further includes stopping transmission of the inter-UE coordination information independent of SPS packet transmission.

Aspect 15 is an apparatus for wireless communication at a UE comprising means to perform the method of any of aspects 1-14.

In aspect 16, the apparatus of aspect 15 further includes at least one antenna and a transceiver coupled to the at least one antenna.

Aspect 17 is an apparatus for wireless communication at a UE comprising a memory and at least one processor coupled to the memory, the memory and the at least one processor configured to perform the method of any of aspects 1-14.

In aspect 18, the apparatus of aspect 17 further includes at least one antenna and a transceiver coupled to the at least one antenna and the at least one processor.

Aspect 19 is a non-transitory computer-readable medium storing computer executable code for wireless communication at a UE, where the code when executed by a processor causes the processor to implement the method of any of aspects 1-14.

Aspect 20 is a method of wireless communication, comprising: receiving one or more of a status of a UE, a capability of the UE, or a report; and configuring the UE with a probability threshold for transmission of inter-UE coordination information in a sidelink transmission.

In aspect 21, the method of aspect 20 further includes that the sidelink transmission is based on a SPS reservation.

In aspect 22, the method of aspect 21 further includes that the sidelink transmission is a non-initial transmission of the SPS reservation.

In aspect 23, the method of any of aspects 20-22 further includes that the report comprises a CBR, and the probability threshold is based on the CBR.

In aspect 24, the method of any of aspects 20-23 further includes that the status of the UE comprises a coverage status of the UE, and the probability threshold is based on the coverage status.

Aspect 25 is an apparatus for wireless communication comprising means to perform the method of any of aspects 20-24.

In aspect 26, the apparatus of aspect 25 further includes at least one antenna and a transceiver coupled to the at least one antenna.

Aspect 27 is an apparatus for wireless communication comprising a memory and at least one processor coupled to the memory, the memory and the at least one processor configured to perform the method of any of aspects 20-24.

In aspect 28, the apparatus of aspect 27 further includes at least one antenna and a transceiver coupled to the at least one antenna and the at least one processor.

Aspect 29 is a non-transitory computer-readable medium storing computer executable code for wireless communication, where the code when executed by a processor causes the processor to implement the method of any of aspects 20-24.

What is claimed is:

1. A method of wireless communication at a first user equipment (UE), comprising:
   transmitting a self-reservation for semi-persistent scheduling (SPS) resources reserved for transmission by the first UE;
   receiving sidelink resource reservation information over sidelink from one or more UEs; and
   transmitting, in a subsequent SPS period indicated by the self-reservation, inter-UE coordination information in a sidelink transmission based on a probability threshold being met, the inter-UE coordination information comprising the sidelink resource reservation information received from the one or more UEs.

2. The method of claim 1, wherein the self-reservation comprises a first self-reservation, the method further comprising:
   transmitting a second self-reservation with the inter-UE coordination information in the sidelink transmission.

3. The method of claim 1, further comprising:
   transmitting prior inter-UE coordination information in an initial reservation.

4. The method of claim 1, further comprising:
   skipping transmission of subsequent inter-UE coordination information based on the probability threshold not being met.

5. The method of claim 1, further comprising:
   receiving a configuration of the probability threshold.

6. The method of claim 1, wherein a value of the probability threshold is based on one or more of:
   a channel busy ratio (CBR),
   a channel occupancy threshold,
   a geographic position of the first UE,
   a resource collision ratio, or
   an amount of received inter-UE coordination information from a second UE over a period of time.

7. The method of claim 1, wherein the first UE transmits the inter-UE coordination information based on a periodicity of SPS resources reserved by the first UE.

8. The method of claim 7, wherein the first UE transmits the inter-UE coordination information based on an integer multiple of the periodicity of the SPS resources.

9. The method of claim 7, further comprising:
   reselecting inter-UE coordination resources for transmission of the inter-UE coordination information based on reselection of an SPS resource.

10. The method of claim 7, further comprising:
    stopping transmission of the inter-UE coordination information based on reselection of an SPS resource.

11. The method of claim 7, further comprising:
    reselecting inter-UE coordination resources for transmission of the inter-UE coordination information prior to reselection of an SPS resource.

12. The method of claim 7, further comprising:
    stopping transmission of the inter-UE coordination information prior to reselection of an SPS resource.

13. The method of claim 7, further comprising:
    reselecting inter-UE coordination resources for transmission of the inter-UE coordination information independent of SPS packet transmission.

14. The method of claim 7, further comprising:
    stopping transmission of the inter-UE coordination information independent of SPS packet transmission.

15. A method of wireless communication performed by a network device, comprising:
    receiving one or more of a status of a user equipment (UE), a capability of the UE, or a report; and
    configuring the UE with a probability threshold for transmission of inter-UE coordination information in a sidelink transmission in a subsequent semi-persistent scheduling (SPS) period indicated by a self-reservation for SPS of the UE, the inter-UE coordination information comprising sidelink resource reservation information received from one or more other UEs.

16. The method of claim 15, wherein the sidelink transmission is a non-initial transmission of the SPS reservation.

17. The method of claim 15, wherein the network device receives the report, wherein the report comprises a channel busy ratio (CBR), and the probability threshold is based on the CBR.

18. The method of claim 15, wherein the network device receives the status, wherein the status of the UE comprises a coverage status of the UE, and the probability threshold is based on the coverage status.

19. An apparatus for wireless communication at a first user equipment (UE), comprising:
    a memory; and
    at least one processor coupled to the memory, the memory and the at least one processor configured to:
       transmit a self-reservation for semi-persistent scheduling (SPS) resources reserved for transmission by the first UE;
       receive sidelink resource reservation information over sidelink from one or more UEs; and transmit, in a subsequent SPS period indicated by the self-reservation, inter-UE coordination information in a sidelink transmission based on a probability threshold being met, the inter-UE coordination information comprising the sidelink resource reservation information received from the one or more UEs.

20. The apparatus of claim 19, wherein the self-reservation comprises a first self-reservation, wherein the memory and the at least one processor is further configured to:

transmit a second self-reservation with the inter-UE coordination information in the sidelink transmission.

21. The apparatus of claim 19, wherein the memory and the at least one processor is further configured to:

transmit prior inter-UE coordination information in an initial reservation.

22. The apparatus of claim 19, wherein the memory and the at least one processor is further configured to:

skip transmission of subsequent inter-UE coordination information based on the probability threshold not being met.

23. The apparatus of claim 19, wherein the memory and the at least one processor is further configured to:

receive a configuration of the probability threshold.

24. The apparatus of claim 19, wherein a value of the probability threshold is based on one or more of:

a channel busy ratio (CBR), a channel occupancy threshold, a geographic position of the first UE, a resource collision ratio, or an amount of received inter-UE coordination information from a second UE over a period of time.

25. The apparatus of claim 19, wherein the memory and the at least one processor are configured to transmit the inter-UE coordination information based on a periodicity of SPS resources reserved by the first UE.

26. The apparatus of claim 25, wherein the memory and the at least one processor are configured to transmit the inter-UE coordination information based on an integer multiple of the periodicity of the SPS resources.

27. The apparatus of claim 25, wherein the memory and the at least one processor is further configured to:

reselect inter-UE coordination resources for transmission of the inter-UE coordination information based on reselection of an SPS resource.

28. The apparatus of claim 25, wherein the memory and the at least one processor is further configured to:

stop transmission of the inter-UE coordination information based on reselection of an SPS resource.

29. The apparatus of claim 25, wherein the memory and the at least one processor is further configured to:

reselect inter-UE coordination resources for transmission of the inter-UE coordination information prior to reselection of an SPS resource.

30. The apparatus of claim 25, wherein the memory and the at least one processor is further configured to:

stop transmission of the inter-UE coordination information prior to reselection of an SPS resource.

31. The apparatus of claim 25, wherein the memory and the at least one processor is further configured to:

reselect inter-UE coordination resources for transmission of the inter-UE coordination information independent of SPS packet transmission.

32. The apparatus of claim 25, wherein the memory and the at least one processor is further configured to:

stop transmission of the inter-UE coordination information independent of SPS packet transmission.

33. The apparatus of claim 19, further comprising:

at least one antenna; and a transceiver coupled to the at least one antenna and the at least one processor.

34. An apparatus for wireless communication, comprising:

a memory; and at least one processor coupled to the memory, the memory and the at least one processor configured to:

receive one or more of a status of a user equipment (UE), a capability of the UE, or a report; and configure the UE with a probability threshold for transmission of inter-UE coordination information in a sidelink transmission in a subsequent semi-persistent scheduling (SPS) period indicated by a self-reservation for SPS of the UE, the inter-UE coordination information comprising sidelink resource reservation information received from one or more other UEs.

35. The apparatus of claim 34, wherein the sidelink transmission is a non-initial transmission of the SPS reservation.

36. The apparatus of claim 34, wherein memory and the at least one processor configured to receive the report, wherein the report comprises a channel busy ratio (CBR), and the probability threshold is based on the CBR.

37. The apparatus of claim 34, wherein memory and the at least one processor configured to receive the status, wherein the status of the UE comprises a coverage status of the UE, and the probability threshold is based on the coverage status.

38. The apparatus of claim 34, further comprising:

at least one antenna; and a transceiver coupled to the at least one antenna and the at least one processor.

* * * * *